United States Patent [19]
Hollerback

[11] Patent Number: 4,881,581
[45] Date of Patent: Nov. 21, 1989

[54] VEHICLE AUTOMATIC FUELING ASSEMBLY

[76] Inventor: James A. Hollerback, 5693 Wood Valley Dr., Haslett, Mich. 48840

[21] Appl. No.: 248,154

[22] Filed: Sep. 23, 1988

[51] Int. Cl.⁴ .......................... B67D 5/04; B65B 3/04
[52] U.S. Cl. ........................................ 141/113; 141/1; 141/83; 141/94; 141/98; 134/45; 134/123; 15/DIG. 2; 222/2; 901/16; 901/23; 901/47; 901/50
[58] Field of Search ................. 901/50, 46, 47, 16, 901/23, 24; 222/2; 141/98, 94, 284, 83, 113, 283, 311 R, 387; 134/52 R, 115 R, 123; 174/57 R, 45; 15/DIG. 2

[56] References Cited

U.S. PATENT DOCUMENTS

| | | | |
|---|---|---|---|
| 1,712,498 | 5/1929 | Hawxhurst | 222/52 |
| 2,149,602 | 3/1939 | Horvath | 137/363 |
| 2,384,628 | 9/1945 | Krone et al. | 141/113 |
| 2,427,552 | 9/1947 | De Lancey | 222/72 |
| 2,600,876 | 6/1952 | Jauch et al. | 222/23 |
| 2,623,545 | 12/1952 | Traynor | 137/720 |
| 2,952,387 | 9/1960 | Fowler et al. | 222/52 |
| 3,021,867 | 2/1962 | Gallacher | 137/565 |
| 3,095,020 | 6/1963 | Darwin | 141/283 |
| 3,273,753 | 9/1966 | Johnson et al. | 222/52 |
| 3,410,320 | 11/1968 | Ginsburgh et al. | 141/98 |
| 3,448,843 | 6/1969 | Mesh | 222/2 X |
| 3,527,268 | 9/1970 | Ginsburgh | 141/98 |
| 3,529,611 | 9/1970 | Daum et al. | 134/123 X |
| 3,536,109 | 10/1970 | Ginsburgh et al. | 141/98 |
| 3,601,284 | 8/1971 | Yamawski | 222/2 |
| 3,606,162 | 9/1971 | Lehmann | 901/16 X |
| 3,642,036 | 2/1972 | Ginsburgh et al. | 141/94 |
| 3,854,054 | 12/1974 | Conn, Jr. | 15/DIG. 2 |
| 4,039,075 | 2/1977 | Gray | 134/123 X |
| 4,244,403 | 1/1981 | Legleiter | 141/94 |
| 4,367,827 | 1/1983 | Keller et al. | 222/2 |
| 4,402,350 | 9/1983 | Ehret et al. | 141/94 |
| 4,408,943 | 10/1983 | McTammey et al. | 141/387 X |
| 4,639,878 | 1/1987 | Day et al. | 901/47 X |
| 4,665,955 | 5/1987 | Horvath et al. | 141/1 |
| 4,681,144 | 7/1987 | Horvath et al. | 141/1 |
| 4,708,175 | 11/1987 | Janashak et al. | 141/1 |
| 4,712,709 | 12/1987 | Horvath et al. | 141/113 X |
| 4,719,932 | 1/1988 | Burton | 134/123 X |
| 4,796,200 | 1/1989 | Pryor | 901/47 |

Primary Examiner—Ernest G. Cusick
Attorney, Agent, or Firm—Miller, Morriss and Pappas

[57] ABSTRACT

A vehicle automatic fueling assembly having an automatic teller-type control command center which is energized by insertion of money or credit card by the vehicle driver from within the vehicle to select and pay for the amount of fuel desired. A computer control assembly is provided in operative command control engagement with the automatic teller-type command center so as to selectively actuate a robot controlled fueling assembly having an automatic cut-off fueling nozzle assembly into mating fueling engagement with an automatic cut-off fuel receiving valve assembly provided in associated with the modified gasoline tank of a vehicle. The vehicle automatic fuel assembly is also provided with wheel stop lock means and windshield cleaning and drying means which are also automatically controlled by the computer control assembly. The modified gas tank is provided with a gasoline tank closure door assembly which is selectively actuated to provide fueling access to the fuel receiving valve provided in association therewith.

5 Claims, 6 Drawing Sheets

VEHICLE AUTOMATIC FUELING ASSEMBLY

This invention relates to a vehicle automatic fueling assembly which automatically refuels a vehicle without the assistance of a gasoline station attendant and without the need for the vehicle driver to leave the vehicle.

This invention further relates to a vehicle automatic fueling assembly which automatically controls the fueling apparatus through an automatic teller-type control console command center which can be selectively energized by the driver of the vehicle from the driving position proximate to the control console command center by inserting money and/or credit cards into the control console command center and selecting the amount of fuel desired.

This invention further relates to a vehicle automatic fueling assembly which permits a driver to automatically receive front windshield washing services.

This invention further relates to a vehicle automatic fueling assembly which automatically secures a vehicle in the proper fueling position during the fueling sequence and automatically releases the vehicle when the fueling has been completed.

This invention further relates to a vehicle automatic fueling apparatus in which a robotic structure is used to automatically align the gasoline automatic cut-off fuel nozzle with the opening in the specially adapted vehicle gas tank and automatically move the fuel nozzle into fueling engagement with the automatic cut-off fuel receiving valve of the modified gas tank of the vehicle and automatically disengages the automatic cut-off fuel nozzle from the automatic cut-off fuel receiving valve when the fueling operation has been completed.

Nowhere in the known prior art is there shown a vehicle automatic fueling assembly such as the instant invention whereby the driver of a vehicle can automatically fuel the vehicle without having to leave the driver's seat and without the assistance of a gas station attendant, to select the amount of fuel desired, to pay for the same and to actually have the fuel automatically delivered into the vehicle gas tank, all by use of the driver-actuated control console command center which forms an integral part of the vehicle automatic fueling assembly.

A need has existed for an automatic fueling apparatus for vehicles whereby a vehicle operator can automatically fuel the vehicle without leaving the vehicle and without the assistance of a gasoline station attendant.

A further need has existed for a vehicle automatic fueling apparatus positioned in a drive-through type building whereby a vehicle can be driven into the structure and automatically refueled while the driver remains in the car.

A still further need has existed for an automatic fueling apparatus for vehicles which is controlled by an automatic vending display control console and automatic teller command center apparatus positioned adjacent the driver's window so as to permit the driver to automatically pay for, select the amount of gasoline desired and automatically receive the desired amount of gasoline selected without the need to leave the vehicle and without the assistance of external service personnel.

Yet another need has existed for an automatic fueling apparatus for vehicles which can selectively refuel a vehicle by use of a robotically controlled automatic cut-off gas nozzle which automatically locates and engages the automatic cut-off fuel receiving valve in a specially adapted gasoline tank, delivers a predetermined amount of fuel into the gasoline tank pursuant to directions from the vending display control console command center energized by the driver of the vehicle.

Another need has existed for an automatic fueling apparatus for vehicles which can be energized by the driver of a vehicle positioned proximate thereto so as to pay for and automatically receive a predetermined amount of fuel into the gasoline tank and to automatically receive window washing and drying services if desired, all without leaving the vehicle and without the assistance of service station attendants.

It is therefore an object of this invention to provide a vehicle automatic fueling assembly which automatically refuels a vehicle without the assistance of a gasoline station attendant and without the need for the vehicle driver to leave the vehicle while selecting and paying for the amount of fuel desired and while the fuel is automatically delivered into the specially adapted gasoline tank by use of a robotically controlled automatic cut-off fuel nozzle which (1) automatically locates the gasoline tank fuel receiving valve, (2) moves into selective mating engagement therewith so as to automatically deliver the predetermined amount of fuel in the gasoline tank and (3) which automatically disengages from the gasoline tank when the fueling operation has been completed.

Yet another object of this invention is to provide an automatic vehicle fueling assembly which automatically secures a vehicle in its proper fueling position while automatically receiving fuel and which automatically releases the vehicle when the fueling has been completed.

Other objects and advantages found in the construction of the invention will be apparent from a consideration of the hereinafter appended claims and accompanying drawings.

DESCRIPTION OF THE PREFERRED EMBODIMENT

Figure 1:
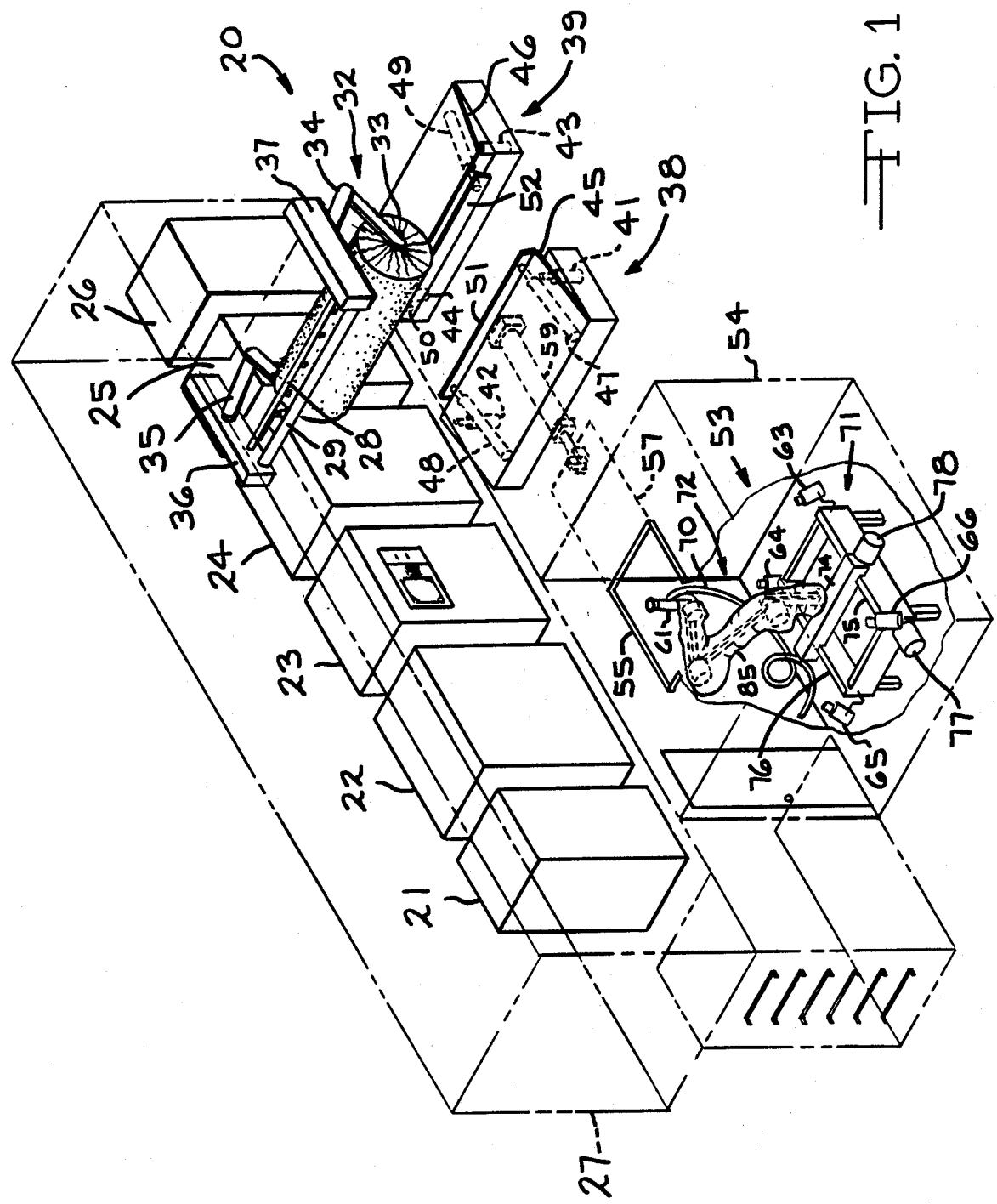
FIG. 1 is a perspective schematic view of the vehicle automatic fueling assembly showing the relative positioning of the various components thereof with respect to each other.

As shown in the schematic drawing of FIG. 1, an embodiment of the vehicle automatic fueling assembly 20 is shown in a drive-in type arrangement which includes a fuel pump assembly 21, a hydraulic and pneumatic control assembly 22, a vending display control console and automatic teller command center 23, a computer control assembly 24, a power supply assembly 25 and water supply assembly 26 which are located on the main floor level area 27 as shown in phantom line. Overhead water spray means 28 and blower dryer means 29 are transversely positioned so as to selectively wash and dry the front windshield 30 of a vehicle 31 positioned thereunder as more specifically shown in FIG. 2.

An overhead windshield brush cleaning assembly 32 is provided which is adapted to selectively lower into rotating contact with the windshield 30 of a vehicle 31 positioned therebelow. The brush 33 is mounted on spaced apart pivotal support arms 34 and 35. The brush motor housing 36 contains the brush motor (not shown) which selectively powers the brush so as to clean the vehicle windshield 30. The pivotal support arms 34 and 35 selectively lower and raise the brush 33 into and out of contact with the windshield 30 and are powered by a motor (not shown) located in the arm motor housing 37.

Figure 2:
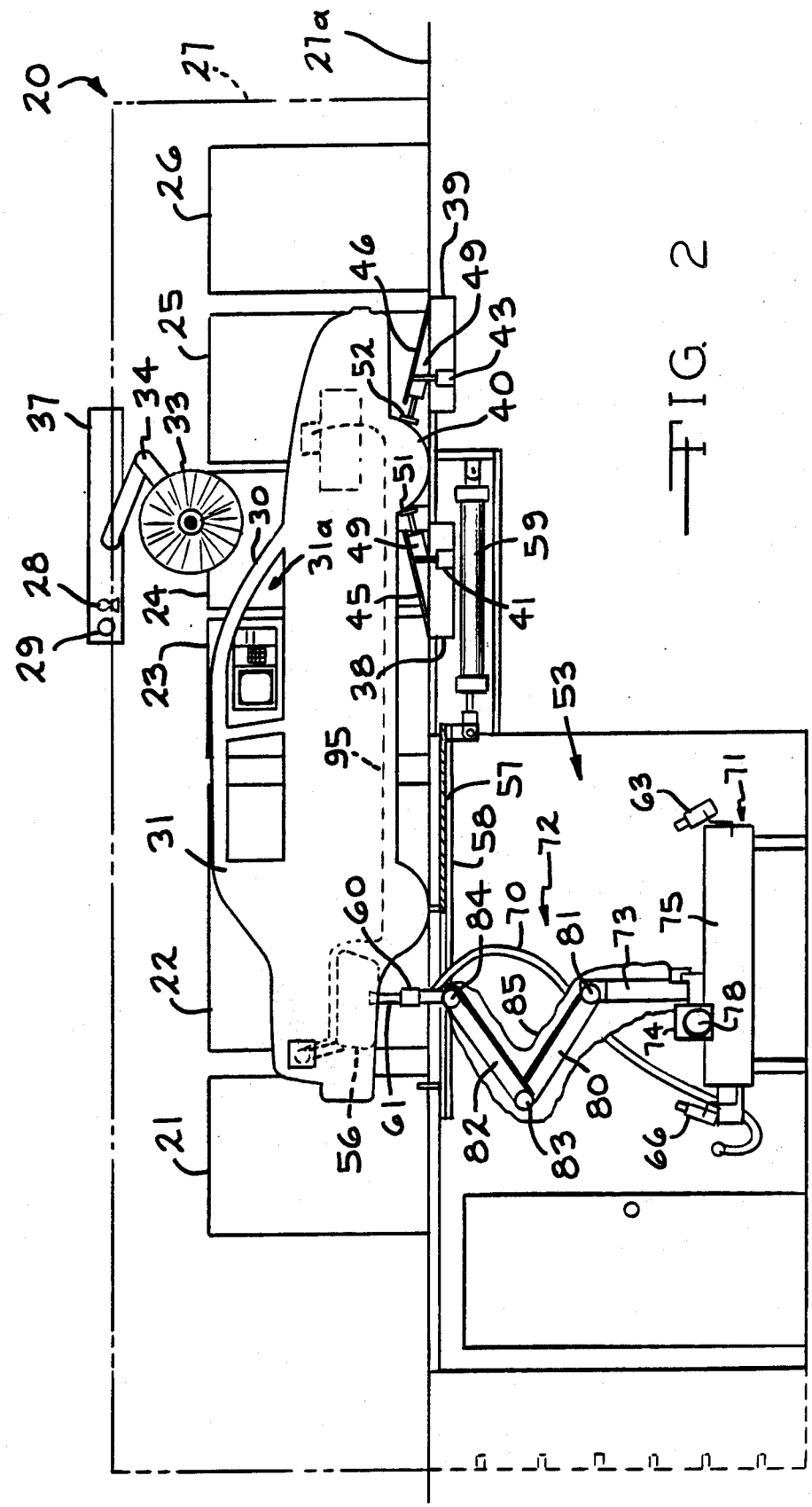
FIG. 2 is a schematic side elevation view of the vehicle automatic fueling assembly showing a vehicle locked into its fueling position in association with the automatic fueling assembly and with the automatic robot controlled fuel nozzle in engagement with the specially adapted gasoline tank of the vehicle.
Figure 3:
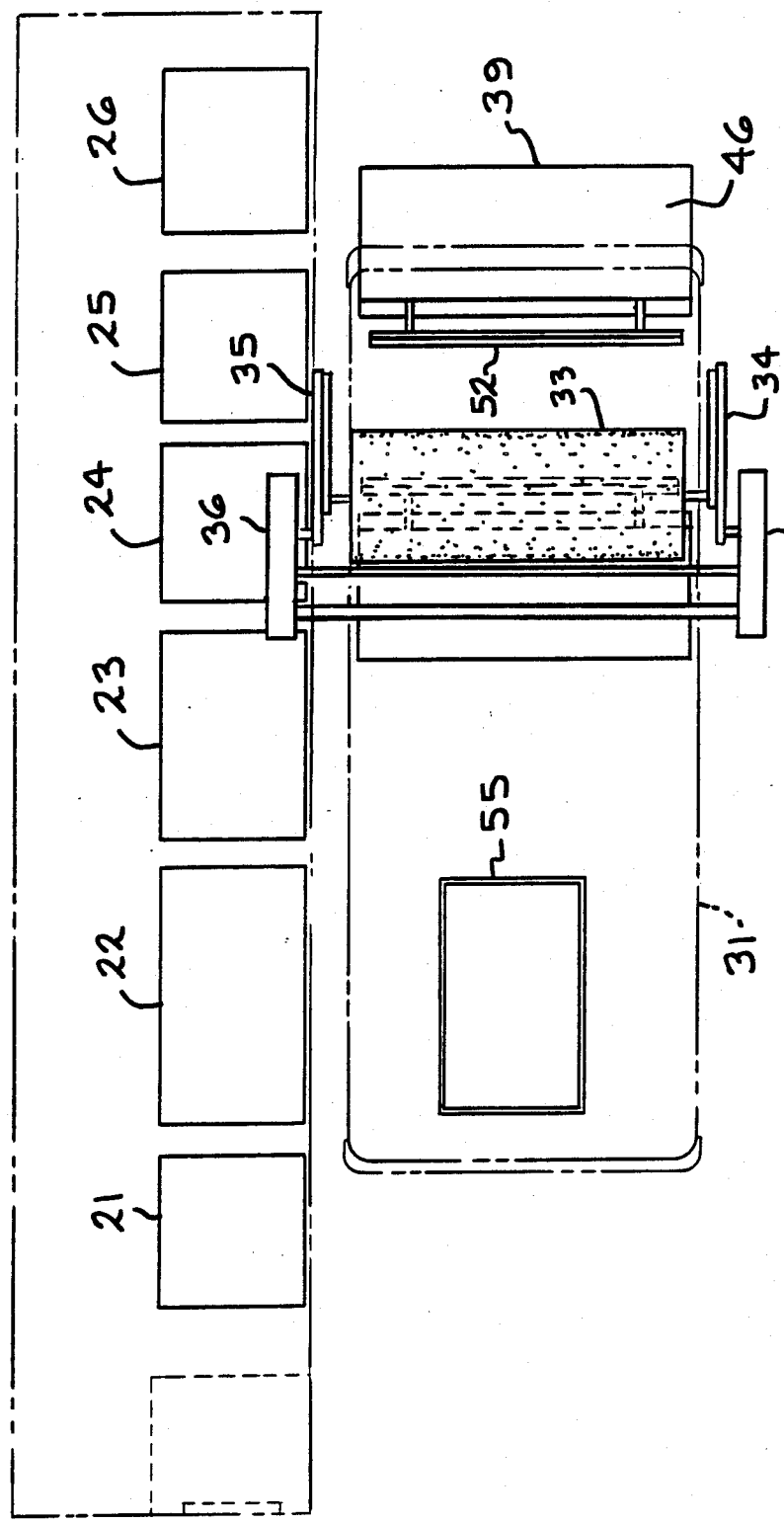
FIG. 3 is a schematic top view of the vehicle automatic fueling assembly showing a vehicle in phantom-line in its in situ fueling position in association therewith.

As shown in FIGS. 1 and 2, a pair of spaced apart wheel stop lock assemblies 38 and 39 are transversely positioned in the floor 27a and are adapted to lockably engage the front wheels 40 when the vehicle 31 is in its proper fueling position proximate to the automatic refueling assembly 20.

Each of the wheel stop lock assemblies, 38 and 39 are provided with pneumatic cylinders 41 and 42, and, 43 and 44, respectively, which are adapted to selectively pivotally raise and lower the pivotally mounted wheel stop lock assembly cover panels 45 and 46, respectively. Each of the cover panels 45 and 46 are provided with a pair of wheel lock stop bar pneumatic actuating cylinders 47 and 48, and 49 50, respectively, fixedly attached to the bottom thereof, which are adapted to selectively move the wheel stop lock bars 51 and 52 respectively into and out of retentive engagement with the front wheels 40 of the vehicle 31 as shown in FIG. 2.

As shown in FIGS. 1 and 2, a robot controlled fueling assembly 53 is provided in storage area 54 located below the floor level 27a. A floor positioned fueling access opening 55 is located in the floor area surface which is in vertical aligned register with the automatically controlled robot fueling assembly 53 positioned therebelow and the specially adapted fuel tank 56 of a vehicle 31 positioned thereabove. A fueling access opening closure door 57 is provided which is normally in a closed position so as to cover the fueling access opening 55 when the automatic fueling assembly 20 is not in use. The closure door 57 is automatically retracted along its track 58 by use of actuating hydraulic cylinder 59 so as to open the fueling access opening 55 when the fueling operation is about to begin. The closure door 57 is shown in its retracted open position within its track 58 in FIG. 2. As further shown in FIG. 2, a frangible automatic emergency fuel cut-off valve 60 is provided in association with the automatic cut-off fueling nozzle assembly 61 which is provided with automatic cut-off fuel nozzle 61a as shown in FIG. 4.

Figures 4, 4A:
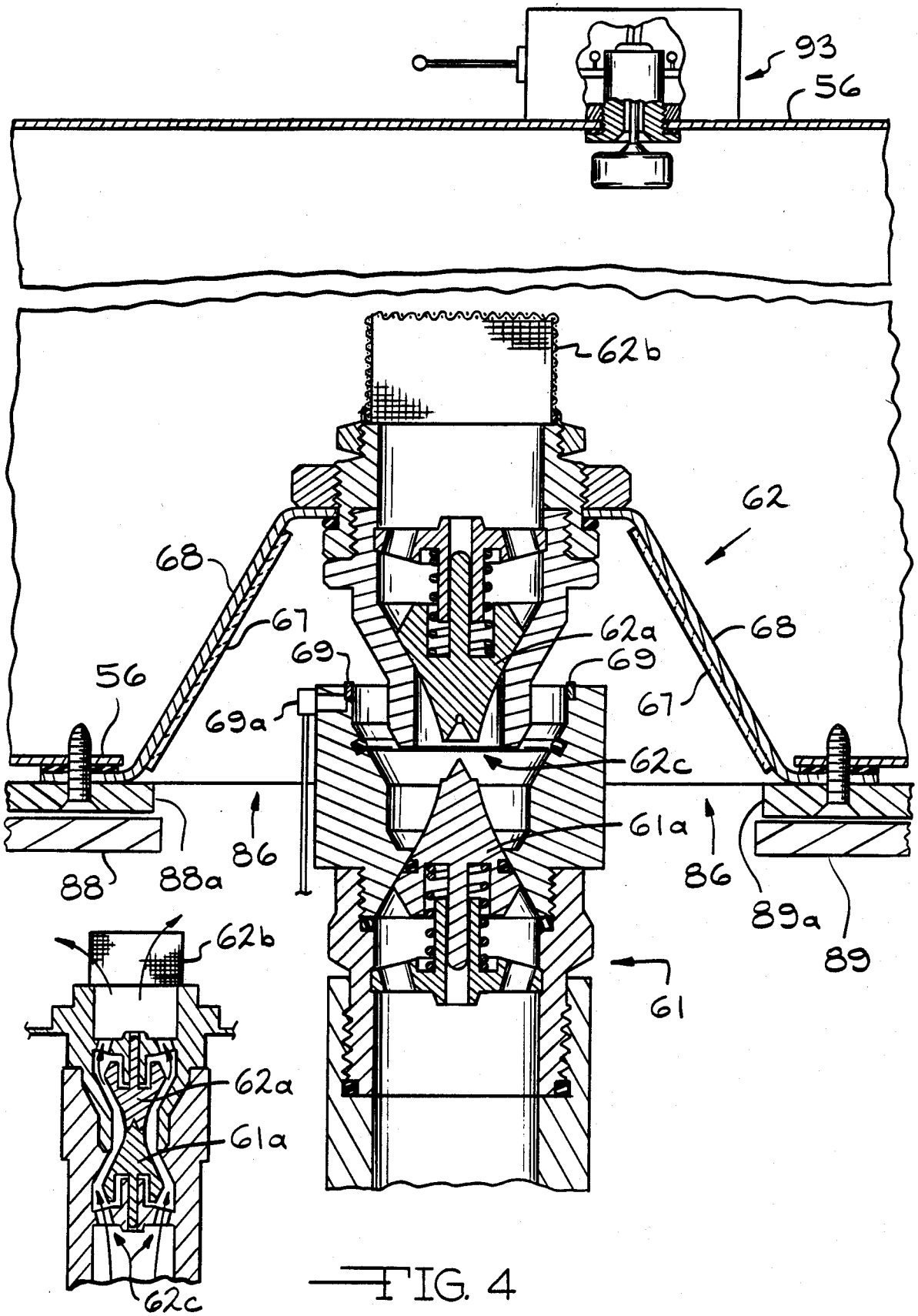
FIG. 4 is a partial schematic cross-sectional side view of the specially adapted gasoline tank with its automatic cut-off fuel receiving valve assembly and with the robot controlled automatic cut-off fuel nozzle in its aligned pre-engagement position proximate thereto.
FIG. 4A is a schematic view showing the automatic cut-off fuel nozzle and the automatic cut-off fuel receiving valve in full mating engagement with the "internal valve" in its open fuel passage position.

As shown in FIGS. 2, 4 and 4A, the robot controlled fueling assembly 53 is adapted to be automatically extendable upwardly so that the automatic cutoff fueling nozzle assembly 61 moves upwardly through the fuel access opening 55 into mating engagement with the specially adapted automatic cut-off fuel receiving valve assembly 62 having an automatic cut-off fuel receiving valve 62a and which is provided in association with the gas tank 56 so as to receive fuel into the tank 56.

While the preferred embodiment of the invention is shown with the automatic cut-off fuel receiving valve assembly 62 positioned at the bottom of the modified gas tank 56, it is considered to be within the scope of the invention to vary the positioning of automatic cut-off gas receiving valve assembly 62 to any desired position in operative connection with the gas tank 56 as long as it is readily accessible for mating engagement with the robot controlled automatic cut-off fueling nozzle assembly 61 as described herein. It is also considered to be within the scope of the invention to vary the location of the robot controlled fueling assembly 53 as desired in relation to the vehicle 31 as long as the robot controlled fueling assembly 53 remains capable of moving the automatic cut-off fueling nozzle assembly 61 into mating engagement with the gas tank automatic cut-off fuel receiving valve assembly 62 as described herein.

The fuel receiving valve 62a is provided with a gasoline filter screen 62b. When the spring biased fuel nozzle 61a is in final mating engagement with the spring biased fuel receiving valve 62a, they are automatically retracted so as to form an "internal flow valve" 62c (see FIG. 4A and FIG. 8) which is open to permit the flow of fuel therethrough into the gas tank 56. This is schematically shown in FIG. 4A. Upon disengagement, the automatic cut-off fuel nozzle 61a and automatic cut-off fuel receiving valve 62a are automatically closed. As shown in FIGS. 1 and 2, the robot fueling assembly 53 has four spaced-apart no contact electro-optical infrared distance measuring sensor devices 63, 64, 65 and 66, respectively, which interact with a reflector panel 67 provided on the conical housing 68 of the fuel receiving valve assembly 62 to automatically actuate the robot fueling assembly 53 so as to move the fueling nozzle assembly 61 upwardly through the access opening 55 into aligned register and final mating engagement with the fuel receiving valve assembly 62 so as to automatically deliver fuel into the gas tank 56. A final position sensor switch 69 is provided on the upper end of the fuel nozzle 61a so as to confirm that final mating engagement has been accomplished and to actuate the fuel on switch 69a which turns on the fuel pump assembly 21 and fuel pump 21a (see FIG. 8) so as to deliver the desired amount of fuel into the gas tank 56 through the fuel line 70.

It is to be understood that all sensor signals are transmitted to the computer control assembly 24 which in turn transmits control signals to the appropriate robot and other actuating assemblies.

Figure 7:
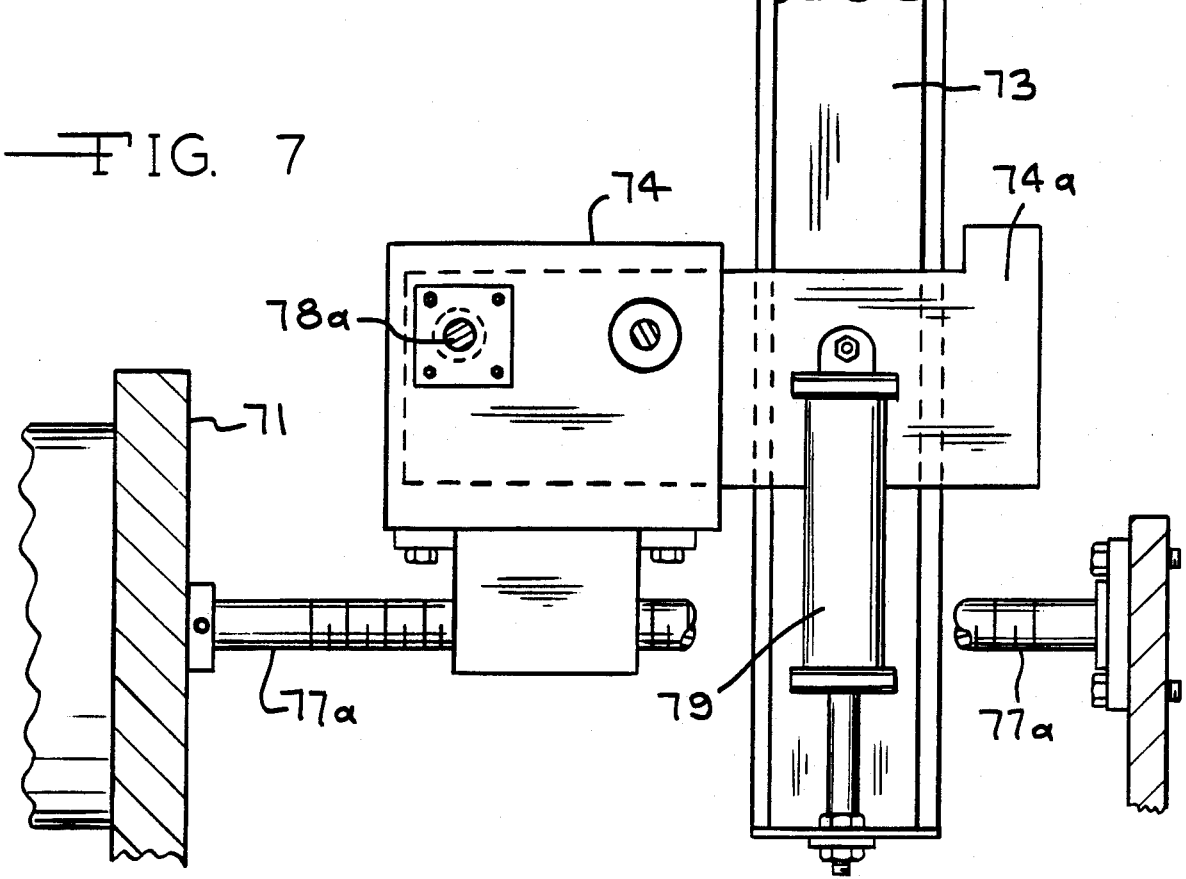
FIG. 7 is a partial schematic schematic view showing the X and Y axis control means for the robot control structure arm of the gasoline fuel nozzle and the final engagement Z axis vertical lift means in association therewith.

The robot fueling assembly 53 comprises a support table 71 upon which the robot assembly structure 72 is movably positioned. The sensor devices 63, 64, 65 and 66, respectively, which are positioned at each corner of the support table 71 cooperate to controllably actuate the robot assembly 72 to move the fueling nozzle assembly 61 into mating engagement with the gas tank fuel receiving valve assembly 62. As shown in FIGS. 1, 2 and 7, the robot assembly structure 72 is mounted upon a vertical lift shaft 73 which is supported on support attachment 74a that is movably provided in cross-member 74. The cross-member 74 is selectively movable along an "x" axis on the sides 75 and 76 of the support table 71 by "x"-axis motor 77 and drive screw 77a (see schematic view of FIG. 7) in response to corresponding electronic signals received from the sensor devices 63, 64 65 and 66 in co-action with the reflective panel 67. The vertical lift shaft 73 is similarly movable along a "y" axis along cross member 74 by y-axis motor 78 and drive screw 78a which engages the lift shaft support movable attachment 74a provided on cross-member 74. When the fueling nozzle assembly 61 has thus been moved into aligned register proximate to the fuel receiving valve assembly 62, the vertical lift shaft 73 is vertically extended upwardly along the "z" axis by actuation of the lift cylinder 79 (see FIG. 7) so as to move the fuel nozzle assembly 61 into final mating engagement with the gas tank fuel receiving valve assembly 62, as previously described.

As shown in FIGS. 2, the robot assembly structure 72 is comprised of arm 80 which is pivotally mounted at one end to the upper end to the vertical lift shaft 73. The arm 80 is arcuately movable by motor 83. A second arm 82 is pivotally connected to arm 80 and is arcuately movable by motor 83. The vertically-oriented nozzle assembly 61 is pivotally mounted upon arm 82 and is arcuately movable by motor 84 so as to make final arcuate movements to achieve final aligned register with the gas tank fuel receiving valve assembly 62. As stated above, final mating engagement is accomplished by upward movement of the vertical lift shaft 73. All robot assembly movements are controlled by the computer control assembly 24 in response to the sensor signals that the computer receives. The robot assembly structure 72 is covered by a flexible protective cover 85 so as to protect it from debris brought in by vehicles.

It is considered to be within the scope of the invention to utilize a simplified dedicated robot assembly with other types of associated locator sensing units which are well known in the art and which could easily accomplish the desired automatic fueling operation at a minimum cost. Although not shown herein, such well known simplified dedicated robot and sensor control systems are considered to be within the scope of this invention.

As shown in FIGS. 4, 4A, 5 and 6, and as stated previously, the vehicle gas tank 56 is modified to include a downwardly directed specially adapted automatic cut-off fuel receiving valve assembly 62 which comprises a conical housing 68 having a sensor signal reflective panel 67 on the inside downwardly facing surface thereof. The reflective panel 67 is positioned to coact with the sensor devices 63, 64, 65 and 66 provided in association with the robot fueling assembly 53 so as to bring the automatic cut-off fueling nozzle 61 and the automatic cut-off fuel receiving valve assembly 62 structures into mating fuel delivery engagement. This type of automatic cut-off snap-engagement and disengagement fueling connections are well known in the art, particularly as used in aerial refueling, and will not be described herein, but the teachings thereof as known in the prior art are included herein by reference.

Figure 5:
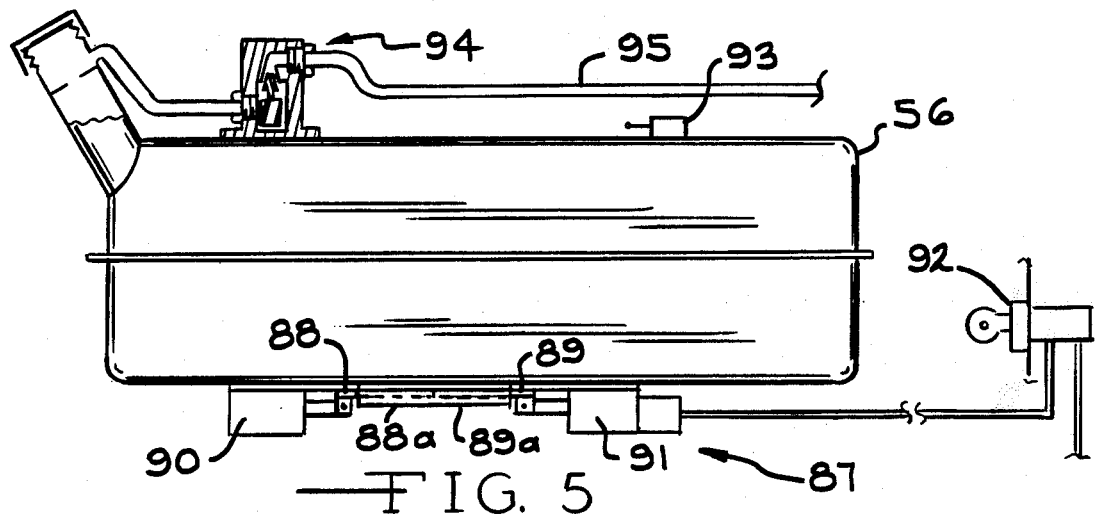
FIG. 5 is a schematic side elevation view of the specially adapted gasoline tank showing the fuel receiving opening closure doors in association therewith.
Figure 6:
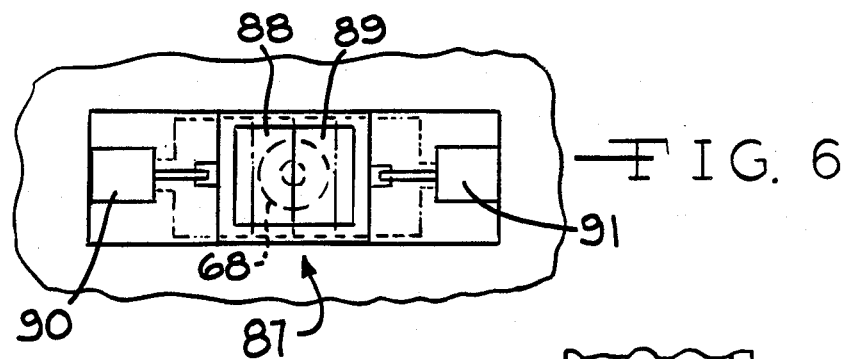
FIG. 6 is a partial schematic bottom view of the gas tank closure doors showing the actuating assembly in association therewith.

As shown in FIGS. 4, 5 and 6, the gas tank 56 is provided with an opening 86 in the bottom thereof which is in coextensive registry with the fuel receiving valve assembly 62 mounted thereabove. The opening 86 is provided with a gas tank closure assembly 87. As shown in FIGS. 5 and 6, the closure assembly 87 is comprised of opposed closure doors 88 and 89 which are selectively retractable by cylinders 90 and 91, respectively, so as to uncover the opening 86 to permit access of the fuel nozzle assembly 61 to the fuel receiving valve assembly 62 as shown in FIG. 4. The closure doors 88 and 89 are retained in frames 88a and 89a respectively. The closure doors 88 and 89 can be automatically opened by use of a modified ignition key 92 which automatically opens the closure doors when the vehicle motor is turned off. Alternatively, separate gas tank closure door switch can be utilized if desired to operably retract the doors from their normally closed position.

Figure 8:
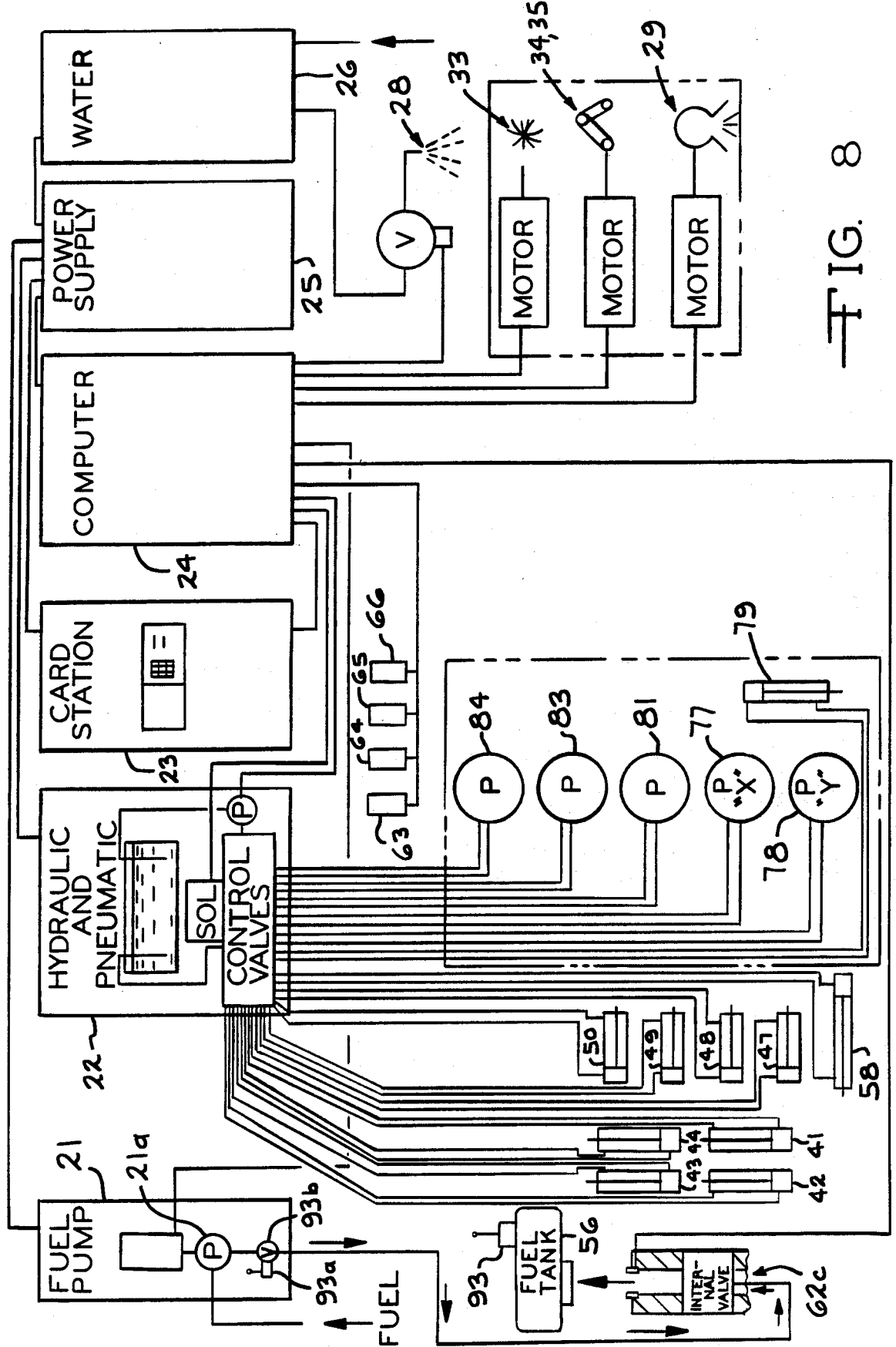
FIG. 8 is a schematic control diagram of the vehicle automatic fueling apparatus showing the control and actuating means in association with the various components thereof.

As shown in FIG. 4, 5 and 8, the modified gas tank 56 is provided with an automatic float switch and transmitter assembly 93 which signals the signal receiver 93a (see FIG. 8) provided in association with the valve shut-off valve control 93b in the automatic fuel pump assembly 21 that the tank 56 has been filled so as to actuate valve control 93b to stop automatic delivery of fuel to the tank 56.

In addition, a safety float shut off valve assembly 94 is provided in the overflow vent line 95. The closure of the safety shut off valve 94 creates a back pressure which automatically actuates an emergency fuel delivery shut off (not shown) of the automatic fuel pump assembly 21.

The schematic control diagram of FIG. 8 is included to illustrate the manner in which the various components of the vehicle automatic fueling assembly invention are sequentially actuated to automatically fuel the vehicle positioned in association therewith.

In use, the driver drives his vehicle 31 into the drive-in type fueling lane parallel to the automatic fueling assembly 20 as shown in FIG. 2 so that the driver's position 31a is adjacent to the vending display control console and automatic teller unit 23. In this position, the vehicle gas tank 56 is in vertical registry with the floor positioned fueling access opening 55 beneath which the automatically controlled robot fueling assembly 53 is positioned. The driver activates the automatic fueling assembly 20 by inserting money or credit card into the control console automatic teller unit, command center 23. The driver makes a selection on the control console 23 whether a "fill up" or predetermined amount of fuel is desired. After the selection is made, the modified vehicle ignition switch 92 must be turned off to turn off the vehicle motor and to retractably open the gas tank closure doors 88 and 89 so as to expose the automatic cut-off fuel receiving valve assembly 62 positioned within the gas tank, thereby exposing the sensor signal reflective panel 67 provided on the downwardly facing surface of the conical housing 68 of the fuel receiving valve assembly 62 to the area therebelow.

If the foregoing initial operational steps are not sequentially made within 10 seconds, the fueling process will be discontinued and the card will be returned. If the foregoing operational steps are in fact taken, control console command center 23 will "instruct" the computer control center assembly 24 and power supply assembly 25 to commence the automatic fueling operation as hereinafter described. The computer control assembly 24 will "instruct" the hydraulic and pneumatic control assembly 22 to actuate the pneumatic cylinders 41, 42, 43 and 44 to pivotally raise the fuel stop assembly cover panels 45 and 46, respectively. The wheel lock stop bar pneumatic actuating cylinders 47, 48, 49 and 50 are then actuated to move the wheel stop lock bars 51 and 52 into their respective front and rear retentive lock positions against the front wheels 40 of the vehicle 31 as shown in FIG. 2. A sensor (not shown) retains the wheel stop lock bars 51 and 52 in their retentive lock position against the front wheels 40 during the entire fueling operation.

The control console command center 23 then automatically "instructs" the computer control center assembly 24 to actuate the large cylinder 59 to retract the heavy duty closure door 57 so as to uncover the floor positioned fueling access opening 55 to expose the robot controlled fueling assembly 53 positioned therebelow. The robot controlled fueling assembly 53 consists of a support table 71 provided with sensor location scanning devices 63, 64, 65 and 66 which are automatically actuated to locate in coaction with the reflector panel 67, the gas tank fuel receiving valve assembly 62 and "directs" the robot assembly by movement along the "x" and "y" axis directional and the vertical extension capabilities ("z" axis) of the support table 71 to bring the fueling nozzle assembly 61 into vertically aligned register with the gas tank fuel receiving valve assembly 62 and then into final mating engagement so that the spring biased fuel nozzle 61a moves into actuating contact with the spring biased fuel receiving valve 62a causing a mutual biased opening of the internal "valve" 62c to allow passage of fuel into the gas tank 56 as shown in FIG. 4A. When the foregoing mating engagement occurs with the resultant opening of the "internal valve" 62c, a signal is transmitted by the switch 69a to the fuel pump assembly 21 to direct the fuel pump 21a to begin pumping the fuel into the gas tank 56 through the "internal valve" 62c which is opened by the mating engagement of the spring biased fuel nozzle 61a and the spring biased fuel receiving valve 62a as previously described and as shown schematically in FIG. 4A. It should be noted that FIG. 4A has been added only to show the open fuel passage channel 63a and the full structural details of the fuel nozzle 61a and of the fuel receiving valve 62a are shown in FIG. 4. The foregoing mating engagement causes the spring biased valve 61a and the fuel receiving valve 62a to mutally retract in opposed directions to open the fuel "internal valve" passage channel 62c into the gas tank 56.

While the fueling operation is in process, the driver can selectively "instruct" the teller-type command center 23 to initiate the washing of the front windshield by automatically actuating the water spray assembly 28, the windshield brush assembly 32 and the blow dryer assembly 29 which operate as previously described herein.

When the fueling has been completed the appropriate signal automatically is sent to the fuel pump assembly 21 to stop the pumping of fuel. Thereafter, the robot fueling assembly 53 is automatically retracted so as to disengage the fuel nozzle 61a from the gas receiving fueling valve 62a. When the robot fueling assembly 53 is fully retracted back through the fueling access opening 55 down into its normal rest position in the below surface storage area 54. Thereafter, the closure door 57 is automatically moved to its normal closed position across the fueling access opening 55. The wheel stop lock assemblies 38 and 39 are disengaged from the front wheels 40 and retracted into their normal rest position below the floor surface with the cover panels 45 and 46 providing a continuity of the floor surface 27. The driver is signalled by appropriate visual or sound means that the fueling process is completed and that payment has ben made. The driver removes the credit card from the automatic teller and turns on the modified ignition key to start the vehicle, thereby effecting closure of the gas tank closure doors and drives away. The entire fueling process has been completed without the necessity for the driver to leave the safety and comfort of his vehicle.

It is thus seen that a unique vehicle automatic fueling assembly is provided which enables a driver to order and pay for fuel and have it automatically delivered into the gas tank of the vehicle without the necessity of leaving his vehicle or requiring the assistance of a service station attendant. While there are partially automated gasoline stations in the known prior art which utilize automatic teller-type stations to permit a driver to use a credit card or cash to pay for and order fuel, it is still necessary for the driver to leave the safety of his vehicle in order to manually place and hold the fuel nozzle in the gas tank opening so that the fuel can be delivered into the gas tank unless there is a service station attendant available to accomplish this for him.

It should be noted that the specially adapted gas tank 56 still retains a standard gas cap and neck opening so that the tank is still compatible with existing fuel supply tanks, thereby allowing the driver to refuel at regular service stations when an automatic vehicle fueling assembly is not available.

In summary, the fully automated vehicle fueling assembly shown and described herein which does not require any external manual assistance to deliver the desired amount of fuel into the gas tank of the vehicle while the driver remains securely within his vehicle at all times is not anticipated by the known prior art.

In summary, a vehicle automatic fueling assembly is provided for automatically fueling a vehicle while the driver remains in the vehicle and without external manual assistance. An automatic teller-type command center is provided in a vehicle automatic fueling assembly. The command center is adapted to be selectively energized by a vehicle driver in a vehicle parked in close proximity thereto so as to initiate automatic fueling of the vehicle. The vehicle has a specially modified gasoline tank which is provided with an automatic cut-off fuel receiving valve assembly in operative engagement therewith. A computer control assembly is provided in operative command control engagement with the automatic teller-type command center. The computer control assembly is adapted to selectively operate selected components of a vehicle automobile fueling assembly upon receipt of commands from the teller-type command center. A robot controlled fueling assembly is provided in close proximity to the vehicle being fueled. The robot controlled fueling assembly is provided with an automatic cut-off fueling nozzle assembly. The robot fueling assembly is operatively connected to the computer control assembly. The robot controlled fueling assembly is adapted to move the automatic cut-off fueling nozzle into mating fueling engagement with the automatic cut-off fuel receiving valve assembly upon command from the computer control assembly. The robot fueling assembly is adapted to selectively disengage from the fuel receiving valve assembly when the fueling has been completed upon command from the control assembly. Fuel supply and delivery assembly means are operatively connected to the computer control assembly. The fuel supply and delivery means are adapted to selectively deliver fuel to the automatic cut-off fueling nozzle upon command from the computer control assembly. At least one wheel stop lock assembly is operatively connected to the computer control assembly. The wheel stop lock assembly is adapted to move into retentive lock engagement with the front wheels of a vehicle proximate thereto upon command from the computer control assembly. Sensor means are provided in association with the robot controlled fueling assembly. The sensor means are adapted to act through the computer control assembly to actuate the robot controlled fueling assembly so as to move the fueling nozzle into mating fueling engagement with the fuel receiving valve. An overhead water spray means assembly is operatively connected to the computer control assembly. The overhead spray means assembly is adapted to spray water upon a vehicle windshield positioned thereunder upon command from the computer control assembly. An overhead windshield brush cleaning assembly is operatively connected to the computer control assembly. The overhead windshield brush cleaning assembly is selectively extendable into brushing contact with a vehicle windshield positioned thereunder upon command from the computer control assembly. An automatic cut-off fuel receiving valve assembly is mounted in operative engagement with a modified gasoline tank of a vehicle adapted for automatic fueling engagement with a vehicle automatic fueling assembly. A modified vehicle gas tank is provided with a gas tank engagement housing in operative engagement therewith. The housing is provided with sensor signal reflective panel means in association therewith. The reflective panel means is adapted for coaction with sensor means provided in association with a robot controlled fueling assembly positioned proximate thereto. An automatic cut-off fuel receiving valve is mounted in the housing in operative fuel receiving engagement with the gas tank. The automatic cut-off fuel receiving valve is adapted for selective mating engagement with an automatic cut-off fuel nozzle of a robot controlled fueling assembly positioned proximate thereto. The gasoline tank mounted fuel receiving valve housing is provided with closure doors which are selectively retractable to permit fueling engagement of an automatic cut-off fuel nozzle with the automatic cut-off fuel receiving valve positioned in the housing.

Various modifications of the invention may be made without departing from the principle thereof. Each of the modifications is to be considered as included in the hereinafter appended claims, unless these claims by their language expressly provide otherwise.

I claim:

1. In a vehicle automatic fueling assembly for automatically fueling a vehicle while the driver remains in the vehicle and without external manual assistance, the combination comprising:

an automatic teller-type command center provided in a vehicle automatic fueling assembly, said command center adapted to be selectively energized by a vehicle driver in a vehicle parked in close proximity thereto so as to initiate automatic fueling of said vehicle;

a vehicle mounted specially modified gasoline tank, said specially modified gasoline tank provided with an automatic cut-off fuel receiving valve assembly in operative engagement therewith;

a computer control assembly in operative command control engagement with said automatic teller-type command center, said computer control assembly adapted to selectively operate selected components of a vehicle automobile fueling assembly upon receipt of commands from said teller-type command center;

a robot controlled fueling assembly provided in close proximity to said vehicle being fueled, said robot controlled fueling assembly provided with an automatic cut-off fueling nozzle assembly, said robot fueling assembly being operatively connected to said computer control assembly, said robot controlled fueling assembly adapted to move said automatic cut-off fueling nozzle into mating fueling engagement with said automatic cut-off fuel receiving valve assembly upon command from said computer control assembly, said robot fueling assembly adapted to selectively disengage from said fuel receiving valve assembly when the fueling has been completed upon command from said control assembly;

fuel supply and delivery assembly means operatively connected to said computer control assembly, said fuel supply and delivery means adapted to selectively deliver fuel to said automatic cut-off fueling nozzle upon command from said computer control assembly; and at least one wheel stop lock assembly operatively connected to said computer control assembly, said wheel stop lock assembly movable into retentive lock engagement with the front wheels of a vehicle proximate thereto upon command from said computer control assembly.

2. In the vehicle automatic fueling assembly of claim 1 wherein sensor means are provided in association with said robot controlled fueling assembly, said sensor means adapted to act through said computer control assembly to actuate said robot controlled fueling assembly so as to move said fueling nozzle into mating fueling engagement with said fuel receiving valve.

3. In the vehicle automatic fueling assembly of claim 1 wherein a gasoline tank closure door assembly is provided in association with said specially modified gasoline tank so as to selectively provide fueling access to said automatic cut-off fuel receiving valve assembly.

4. In a vehicle automatic fueling assembly for automatically fueling a vehicle while the driver remains in the vehicle and without external manual assistance, the combination comprising:

an automatic teller-type command center provided in a vehicle automatic fueling assembly, said command center adapted to be selectively energized by a vehicle driver in a vehicle parked in close proximity thereto so as to initiate automatic fueling of said vehicle;

a vehicle mounted specially modified gasoline tank, said specially modified gasoline tank provided with an automatic cut-off fuel receiving valve assembly in operative engagement therewith;

a computer control assembly in operative command control engagement with said automatic teller-type command center, said computer control assembly adapted to selectively operate selected components of a vehicle automobile fueling assembly upon receipt of commands from said teller-type command center;

a robot controlled fueling assembly provided in close proximity to said vehicle being fueled, said robot controlled fueling assembly provided with an automatic cut-off fueling nozzle assembly, said robot fueling assembly being operatively connected to said computer control assembly, said robot controlled fueling assembly adapted to move said automatic cut-off fueling nozzle into mating fueling engagement with said automatic cut-off fuel receiving valve assembly upon command from said computer control assembly, said robot fueling assembly adapted to selectively disengage from said fuel receiving valve assembly when the fueling has been completed upon command from said control assembly;

fuel supply and delivery assembly means operatively connected to said computer control assembly, said fuel supply and delivery means adapted to selectively deliver fuel to said automatic cut-off fueling nozzle upon command from said computer control assembly; and an overhead water spray means assembly operatively connected to said computer control assembly, said overhead spray means assembly adapted to spray water upon a vehicle windshield positioned under said overhead spray means upon command from said computer control assembly.

5. In a vehicle automatic fueling assembly for automatically fueling a vehicle while the driver remains in the vehicle and without external manual assistance, the combination comprising:

an automatic teller-type command center provided in a vehicle automatic fueling assembly, said command center adapted to be selectively energized by a vehicle driver in a vehicle parked in close proximity thereto so as to initiate automatic fueling of said vehicle;

a vehicle mounted specially modified gasoline tank, said specially modified gasoline tank provided with an automatic cut-off fuel receiving valve assembly in operative engagement therewith;

a computer control assembly in operative command control engagement with said automatic teller-type command center, said computer control assembly adapted to selectively operate selected components of a vehicle automobile fueling assembly upon receipt of commands from said teller-type command center;

a robot controlled fueling assembly provided in close proximity to said vehicle being fueled, said robot controlled fueling assembly provided with an automatic cut-off fueling nozzle assembly, said robot fueling assembly being operatively connected to said computer control assembly, said robot controlled fueling assembly adapted to move said automatic cut-off fueling nozzle into mating fueling engagement with said automatic cut-off fuel receiving valve assembly upon command from said computer control assembly, said robot fueling assembly adapted to selectively disengage from said fuel receiving valve assembly when the fueling has been completed upon command from said control assembly;

fuel supply and delivery assembly means operatively connected to said computer control assembly, said fuel supply and delivery means adapted to selectively deliver fuel to said automatic cut-off fueling nozzle upon command from said computer control assembly; and an overhead windshield brush cleaning assembly operatively connected to said computer control assembly, said overhead windshield brush cleaning assembly selectively extendable into brushing contact with a vehicle windshield positioned thereunder upon command from said computer control assembly.

* * * * *